United States Patent
McCann et al.

(10) Patent No.: US 7,407,233 B2
(45) Date of Patent: Aug. 5, 2008

(54) PNEUMATICALLY ACTUATED PARKING BRAKE FOR ELECTRONIC BRAKING SYSTEM

(75) Inventors: Denis John McCann, Rochester Hills, MI (US); Dennis A. Kramer, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 798 days.

(21) Appl. No.: 10/701,351

(22) Filed: Nov. 4, 2003

(65) Prior Publication Data
US 2005/0093365 A1    May 5, 2005

(51) Int. Cl.
*B60R 25/08* (2006.01)
(52) U.S. Cl. .................... 303/89; 303/9; 188/31; 188/265
(58) Field of Classification Search .......... 303/89, 303/20, 30, 2, 3, 9, 13–18, 113.3; 188/31, 188/60, 156–165, 106 P, 106 F, 106 R, 265; 92/27
See application file for complete search history.

(56) References Cited

U.S. PATENT DOCUMENTS

| | | | | | |
|---|---|---|---|---|---|
| 5,370,449 | A | * | 12/1994 | Edelen et al. | 303/3 |
| 5,775,448 | A | * | 7/1998 | Hirahara et al. | 180/24.02 |
| 5,954,162 | A | * | 9/1999 | Feigel et al. | 188/72.6 |
| 6,305,511 | B1 | * | 10/2001 | McCann et al. | 188/265 |
| 6,382,741 | B1 | * | 5/2002 | McCann et al. | 303/191 |
| 6,752,472 | B2 | * | 6/2004 | Bezzina | 303/7 |

FOREIGN PATENT DOCUMENTS

| | | |
|---|---|---|
| EP | 0 207 275 | 1/1987 |
| EP | 0394065 A2 * | 10/1990 |
| EP | 0 891 908 | 1/1999 |
| WO | WO-97/29292 A2 * | 8/1997 |
| WO | WO 99/48738 | 3/1999 |
| WO | WO 01/66376 | 9/2001 |

* cited by examiner

*Primary Examiner*—Pam Rodriguez
(74) *Attorney, Agent, or Firm*—Carlson, Gaskey & Olds

(57) ABSTRACT

A parking brake system pneumatically actuates an air cylinder to mechanically lock a wheel brake in an applied position in response to a parking demand request. The parking brake system includes a dual hand control that has an electronic control element and a pneumatic control element. The electronic control element communicates with an electronic braking system control unit and the pneumatic control element communicates with a parking brake air reservoir. When the dual hand control is moved to a park position, the electronic control element generates an electronic control signal that applies a parking brake force to the wheel brake. The pneumatic control element generates an air signal that is sent to the air cylinder. The air cylinder includes an extendable shaft that supports a lock member. The air signal moves the lock member into engagement with a brake operating member to lock the wheel brake in the applied condition. The wheel brake remains locked even if pressure is released or leaks from the air chamber. When a release command is initiated, the electronic control unit actuates the wheel brake to unload the lock member and return the air cylinder to an unlocked position.

24 Claims, 20 Drawing Sheets

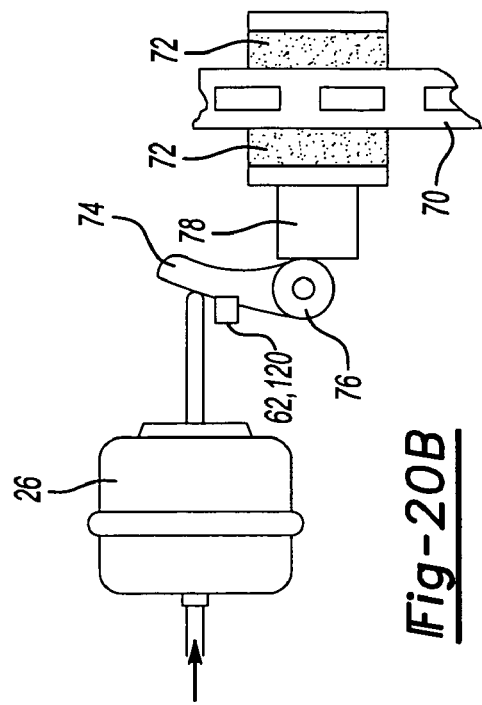
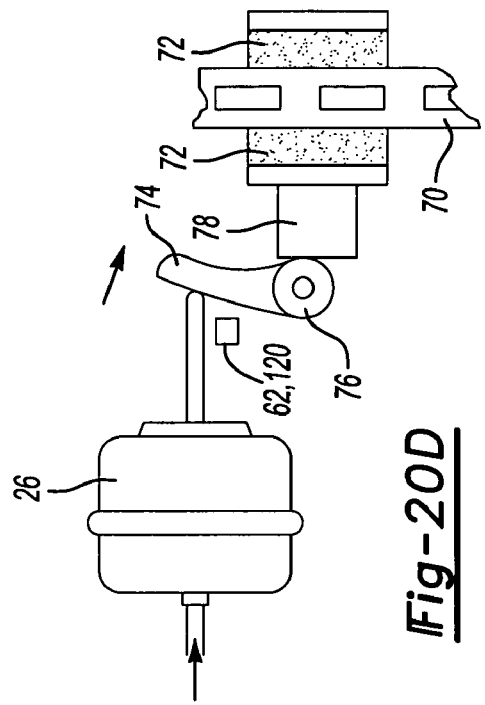
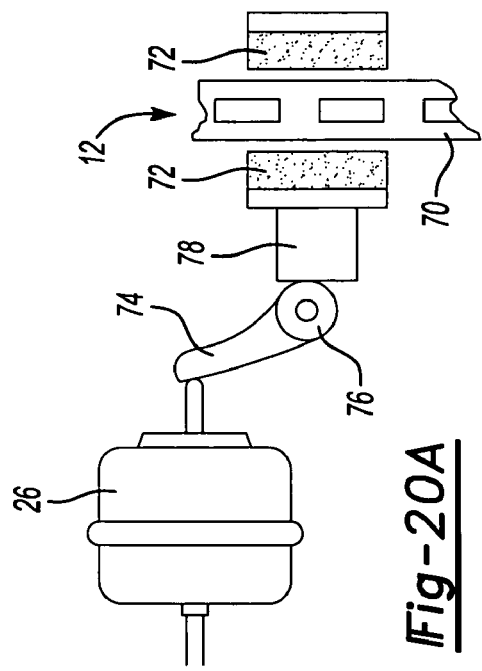
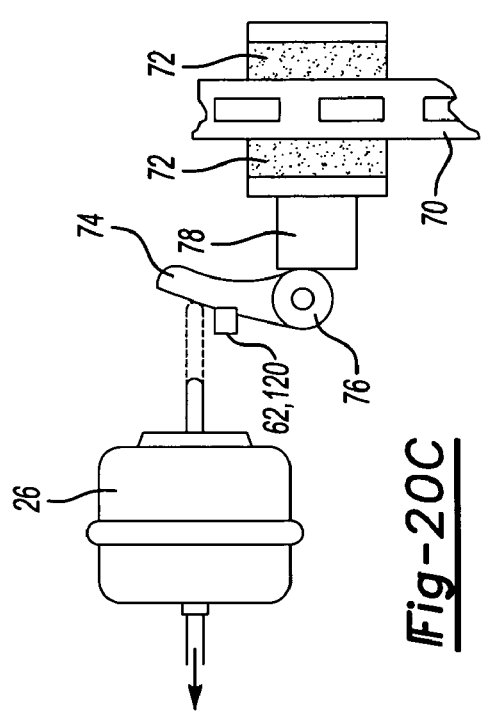

PNEUMATICALLY ACTUATED PARKING BRAKE FOR ELECTRONIC BRAKING SYSTEM

BACKGROUND OF THE INVENTION

The subject invention relates to a parking brake system for a vehicle having an electronic braking system where the parking brake system includes a dual hand control that includes electronic and pneumatic elements to actuate a latching cylinder to mechanically lock a service brake in a parked condition.

Traditionally, heavy commercial vehicles utilize spring actuators to provide the energy needed for parking. Typically, a hand operated lever or handle is moved by an operator into a park position, which causes the spring actuators to be applied. A valve that works on an inverse air principle controls the spring actuators. The valve releases air pressure in response to a parking command, to allow the spring force of the spring actuators at each wheel to apply the brake. During vehicle operation, i.e. under normal driving conditions when parking is not required, the air pressure in the system is sufficient to overcome the spring force in the spring actuators allowing free rotation of the wheel.

One disadvantage with this conventional parking system is that the spring actuators are bulky, heavy, and expensive. This system is especially disadvantageous on front steering axles where packaging space is at a premium. In certain axle configurations, it is not possible to install the spring actuators because there is simply not enough room.

Thus, there is a need for a parking brake system that eliminates the spring actuators while still providing a pneumatically controlled and mechanically lockable park brake that can operate in an electronically controlled parking brake system.

SUMMARY OF THE INVENTION

A parking brake system for a vehicle includes a pneumatically controlled air cylinder that mechanically locks a vehicle brake in an applied position in response to a parking demand request. The parking brake system includes a dual hand control that has an electronic control element and a pneumatic control element. The electronic control element communicates braking demands from the hand control to an electronic braking system control unit. The control unit controls front and rear service braking. The pneumatic control element generates an air signal that is communicated to an air cylinder having a locking mechanism.

When the hand control is moved into a park position, the electronic control element generates an electronic control signal that is communicated to the control unit. The control unit applies the vehicle brakes to the required level for parking by pressurizing air chambers to actuate brake operating members at each vehicle wheel assembly. When the hand control is moved to the park position an air signal is generated, which is communicated to the air cylinder. The air signal causes the cylinder to move the locking mechanism into a locked position. The locking mechanism engages the brake operating member to hold the vehicle brake in a parked condition. The locking mechanism remains in the locked position even when the air chambers are exhausted.

A release command is generated by moving the hand control to a release position. This generates an electronic release signal that is communicated to the electronic braking system control unit. The control unit pressurizes the air chambers to apply the vehicle brakes. This unloads the locking mechanism and allows the air cylinder to return to an unlocked position. The control unit then releases air pressure from the air chambers to move the vehicle brakes to a non-applied position.

The subject system provides a simple and effective method for using pneumatic control to mechanically lock a brake in a parked condition. The system eliminates the need for spring actuators and is easily incorporated into existing braking systems. The system also provides for electronic and pneumatic hand control for parking. These and other features of the present invention can be best understood from the following specification and drawings, the following of which is a brief description.

BRIEF DESCRIPTION OF THE DRAWINGS

FIG. 20A is a schematic diagram of an air chamber and brake assembly in a non-applied or release condition for use in either the system of FIG. 1 or FIG. 13.

FIG. 20B is the air chamber and brake assembly of FIG. 20A in a park applied and locked condition.

FIG. 20C is the air chamber and brake assembly of FIG. 20A in an air chamber exhausted and park lock condition.

FIG. 20D is the air chamber and brake assembly of FIG. 20A in a park release and unlocked condition.

DETAILED DESCRIPTION OF THE PREFERRED EMBODIMENT

Figure 1:
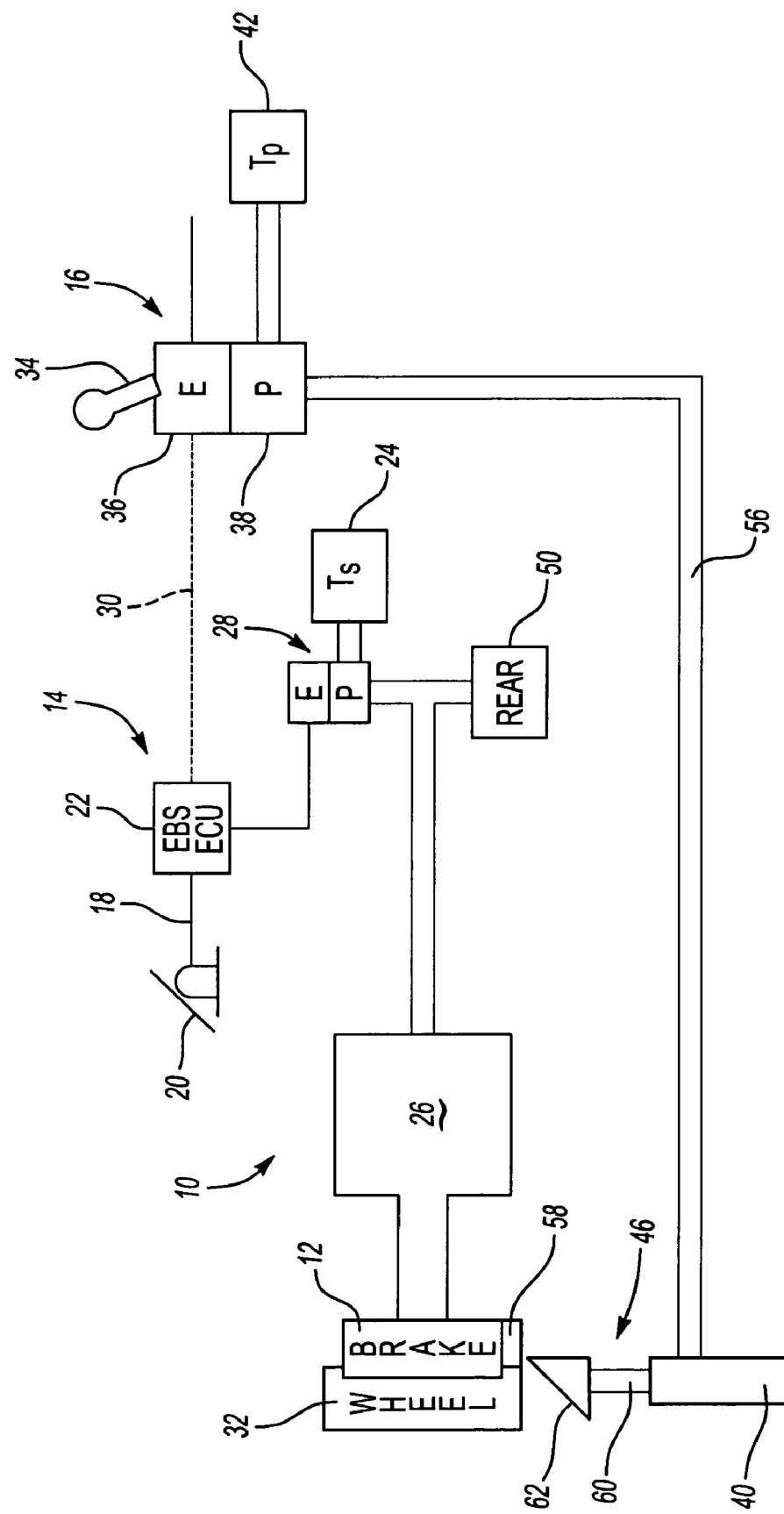
FIG. 1 is a schematic diagram of a vehicle braking system incorporating the subject invention using a spring apply locking device.

A vehicle braking system 10 for a front brake assembly 12 is shown in FIG. 1. The front brake 12 assembly includes a service brake system shown generally at 14 and a parking brake system shown generally at 16. The subject parking brake system 16 is especially useful for front axle assemblies on heavy-duty commercial vehicles, however, it should be understood that the parking brake system 16 could also be utilized in other axle configurations.

The service brake system 14 is preferably an electronic braking system (EBS) that is responsive to electronic control signals 18 generated by depressing a service brake actuator 20, such as a brake pedal. The electronic control signals 18 are communicated to an ECU 22, which then issues a braking command. The ECU 22 includes an electro-pneumatic valve 28, which is preferably integrated with the ECU 22. In response to a braking demand, from the main ECU, the ECU 22 sets the required pressure in the air chamber 26.

A service brake air reservoir or tank 24 provides pressurized air to a front air chamber 26 via the electro-pneumatic valve 28. Once the air chamber 26 is pressurized, the air chamber 26 applies the brake assembly 12 to brake a vehicle wheel 32. The air chamber 26 includes a diaphragm, spring, and push rod assembly, and operates in a manner well-known in the art. Further, while only one air chamber 26 is shown in FIG. 1, it should be understood that each wheel 32 on an axle assembly includes a brake 12 and an associated air chamber 26 to actuate the brake 12.

The parking brake system 16 includes a dual hand control 34 that is manipulated by a vehicle operator. The dual hand control 34 includes an electronic control element 36 and a pneumatic control element 38. The electronic control element 36 generates electrical signals 30 that are communicated to the ECU 22 for the EBS. The pneumatic control element 38 communicates with an air cylinder 40 and a parking brake air reservoir 42. The air cylinder 40 includes a locking mechanism 46 that selectively engages the wheel brake 12 to lock the brake 12 in a park condition. It should be understood that air for parking preferably comes from the parking brake air reservoir 42, however, the system could also be configured to draw air from any other vehicle reservoir, such as the service brake air reservoir 24, for example.

Figure 2:
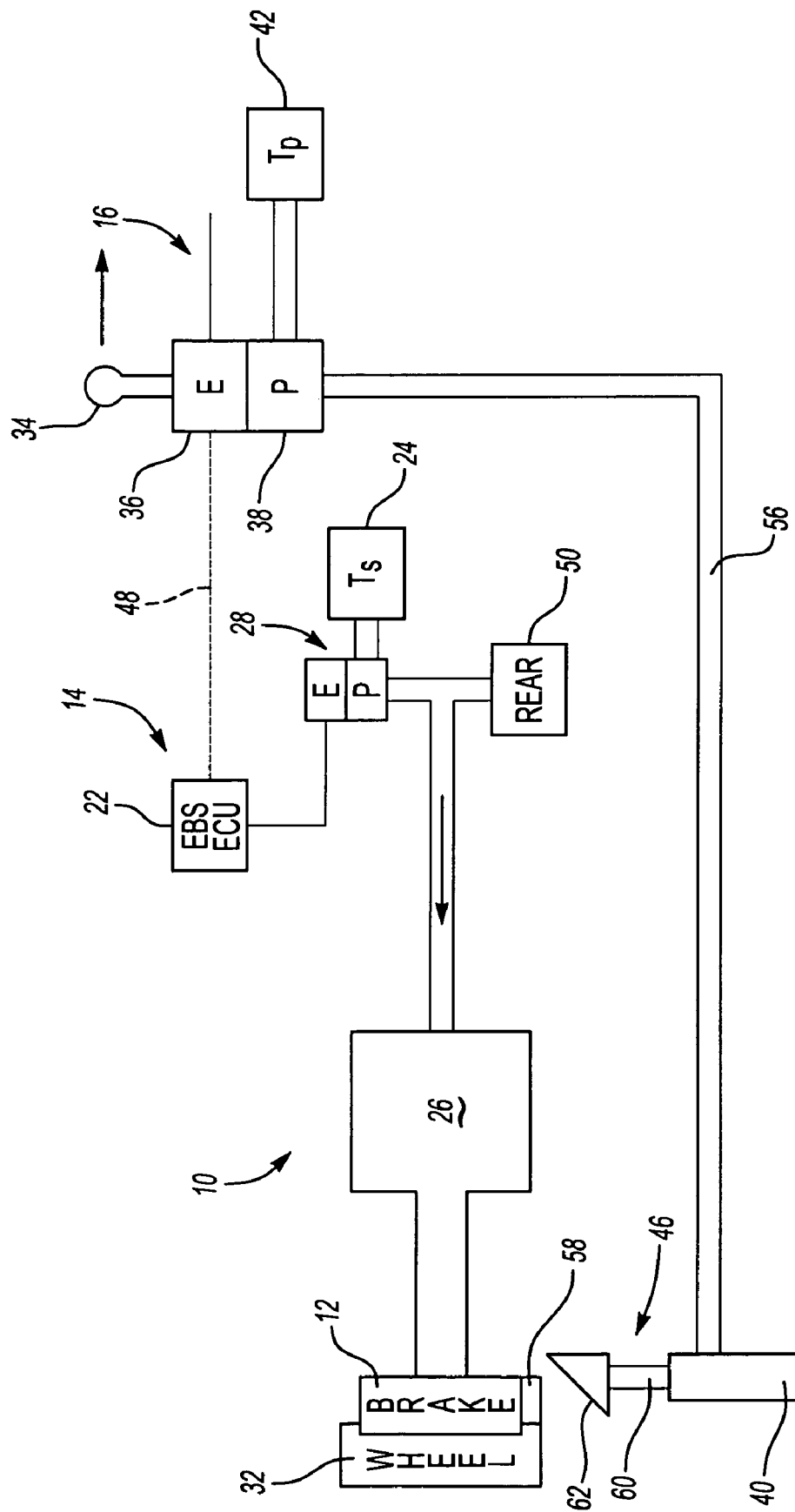
FIG. 2 is a schematic diagram of the system of FIG. 1 showing proportional control.

The parking brake system 16 also provides proportional control as shown in FIG. 2. As the vehicle operator manipulates the hand control 34, an electronic control signal 48 is communicated to the ECU 22. The ECU 22 commands the EBS to apply the brakes, i.e., front 12 and rear 50 brakes, in proportion to the braking demand generated by the hand control 34. As shown in FIG. 2, the EBS pressurizes the air chambers 26 to apply the front brake 12.

Figure 3:
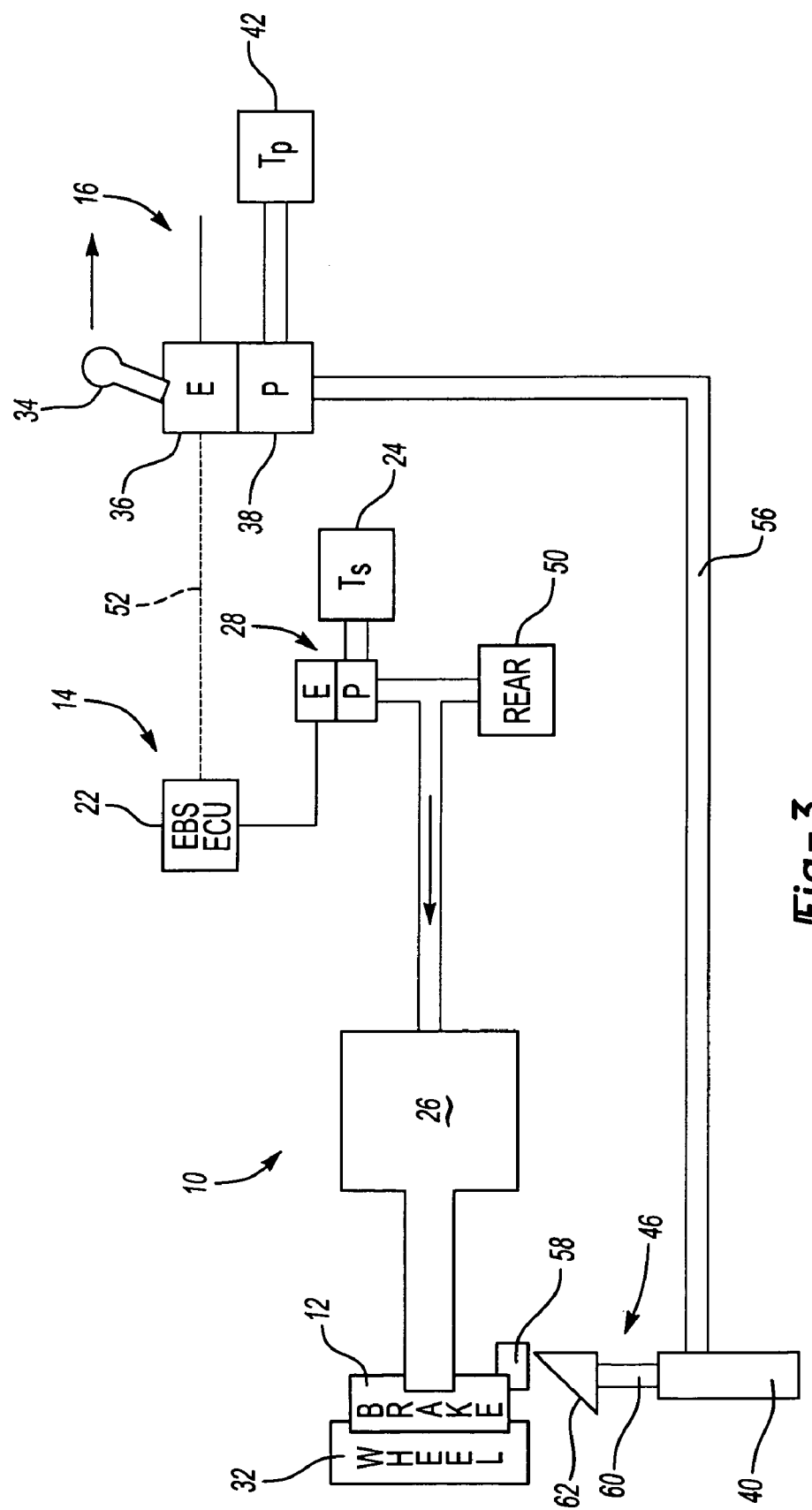
FIG. 3 is a schematic diagram of the system of FIG. 1 showing a parking brake application generated by the EBS.

When the hand control 34 is moved into a park position, as shown in FIG. 3, the electronic control element 36 generates an electronic park demand signal 52 that is communicated to the ECU 22. The ECU 22 commands the EBS to apply the brake 12 at the required braking level for parking. The ECU 22 accomplishes this by pressurizing the air chamber 26 to apply the brake 12.

Figure 4:
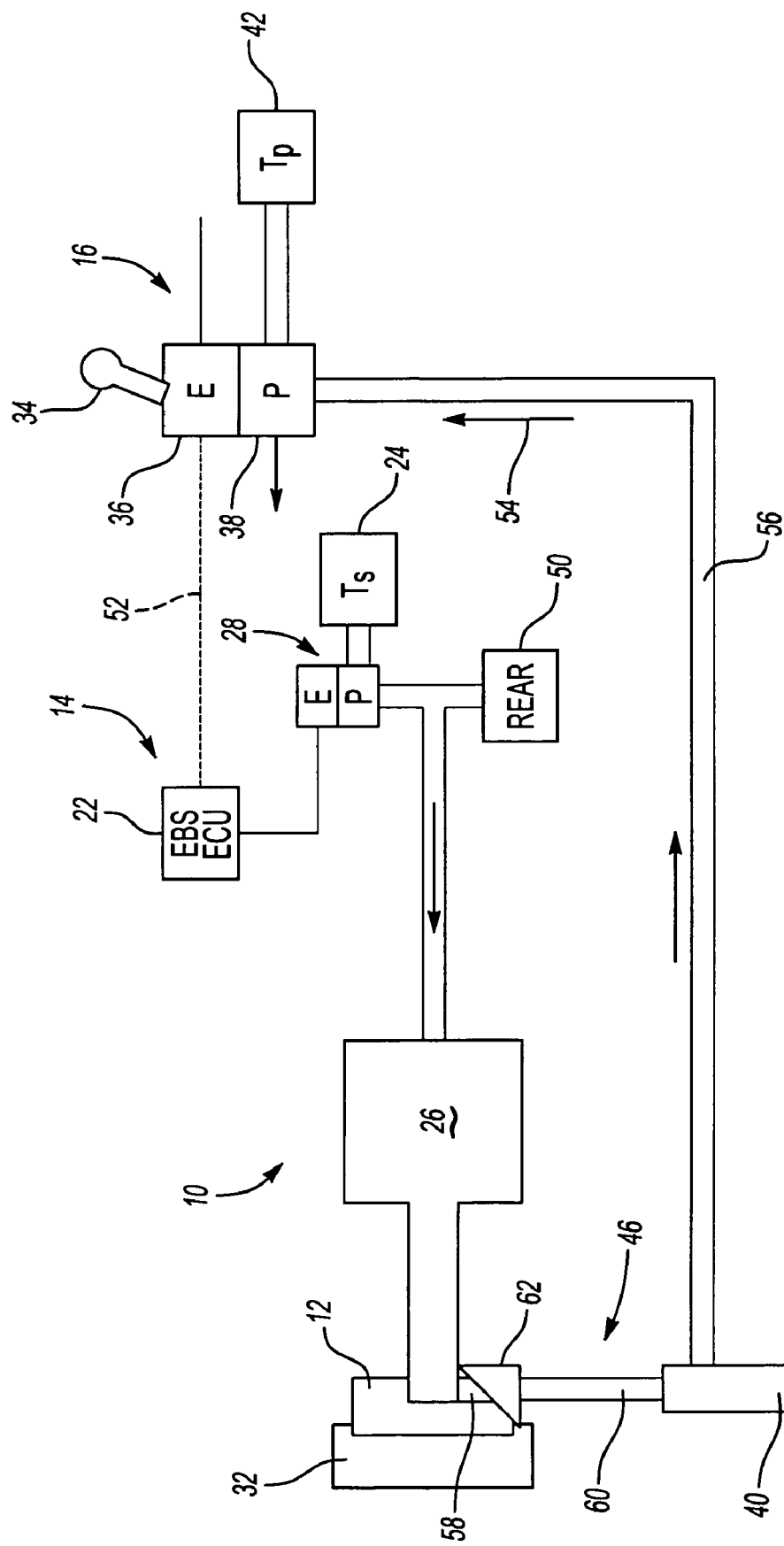
FIG. 4 is a schematic diagram of the system of FIG. 1 showing a parking locking action following an EBS parking brake application.

Also, when the hand control 34 is moved into the park position, the pneumatic control element 38 generates an air signal 54 that is communicated to the air cylinder 40, as shown in FIG. 4. Air from the air connection line 56 to the air cylinder 40 is released via the pneumatic control element 38, which comprises a hand control valve. When the air cylinder 40 is depressurized, the locking mechanism 46 moves to a lock position in which the locking mechanism 46 engages a brake operating member or component 58 to lock the brake 12 in a parked condition. The locking mechanism 46 includes an extension shaft 60 with a wedge member 62 supported on one end of the shaft 60. The wedge member 62 engages the brake operating component 58 to hold the brake 12 in the applied position.

Figure 5:
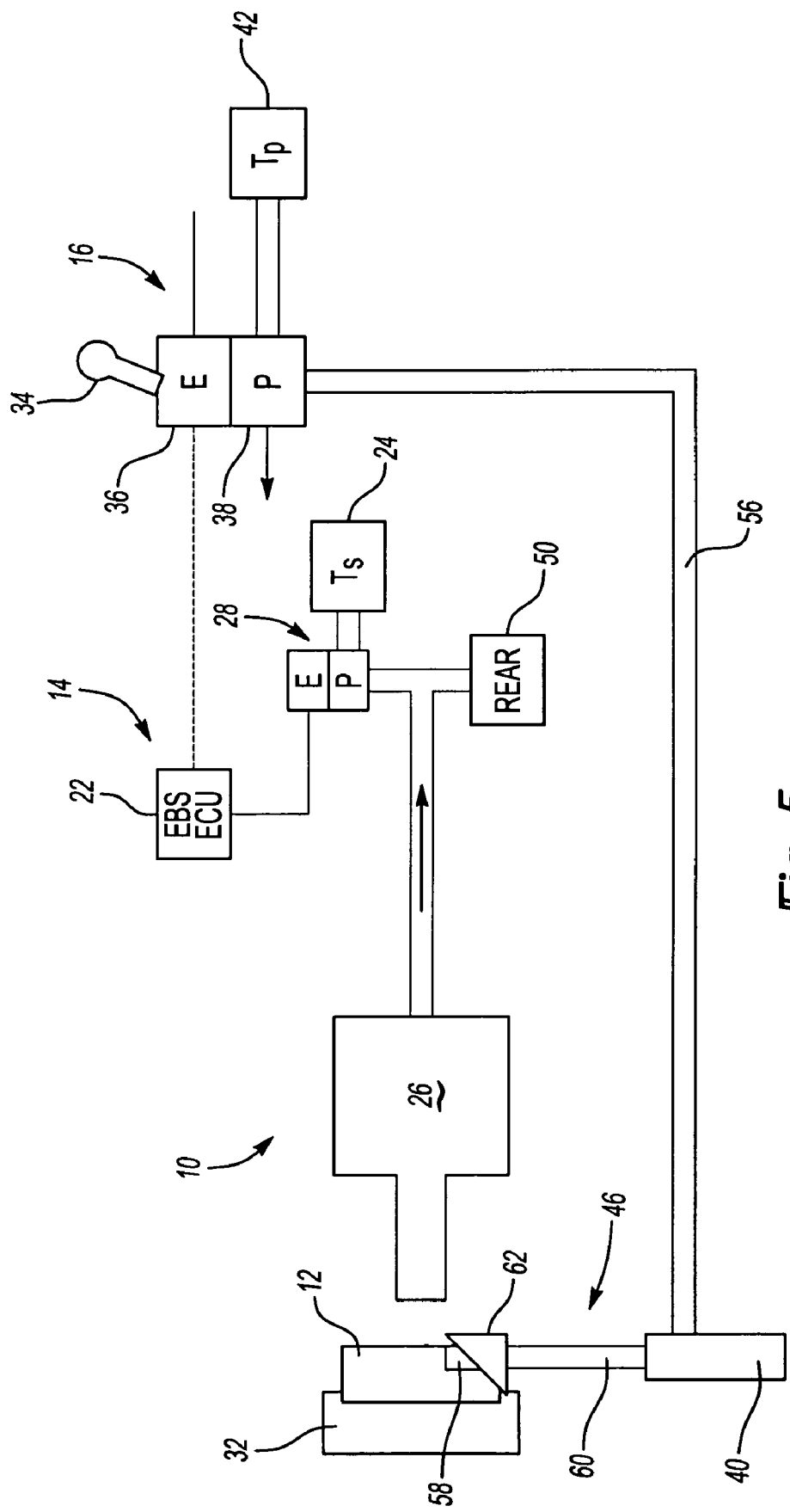
FIG. 5 is a schematic diagram of the system of FIG. 1 showing EBS release with park lock.

Once the air cylinder 40 and locking mechanism 46 are in the lock position, the EBS releases air from the air chamber 26 while the brake 12 remains locked in the applied position, as shown in FIG. 5. Thus, due to the mechanical locking engagement, the system remains in the locked position even when there is no air pressure in the air chamber 26.

Figure 6:
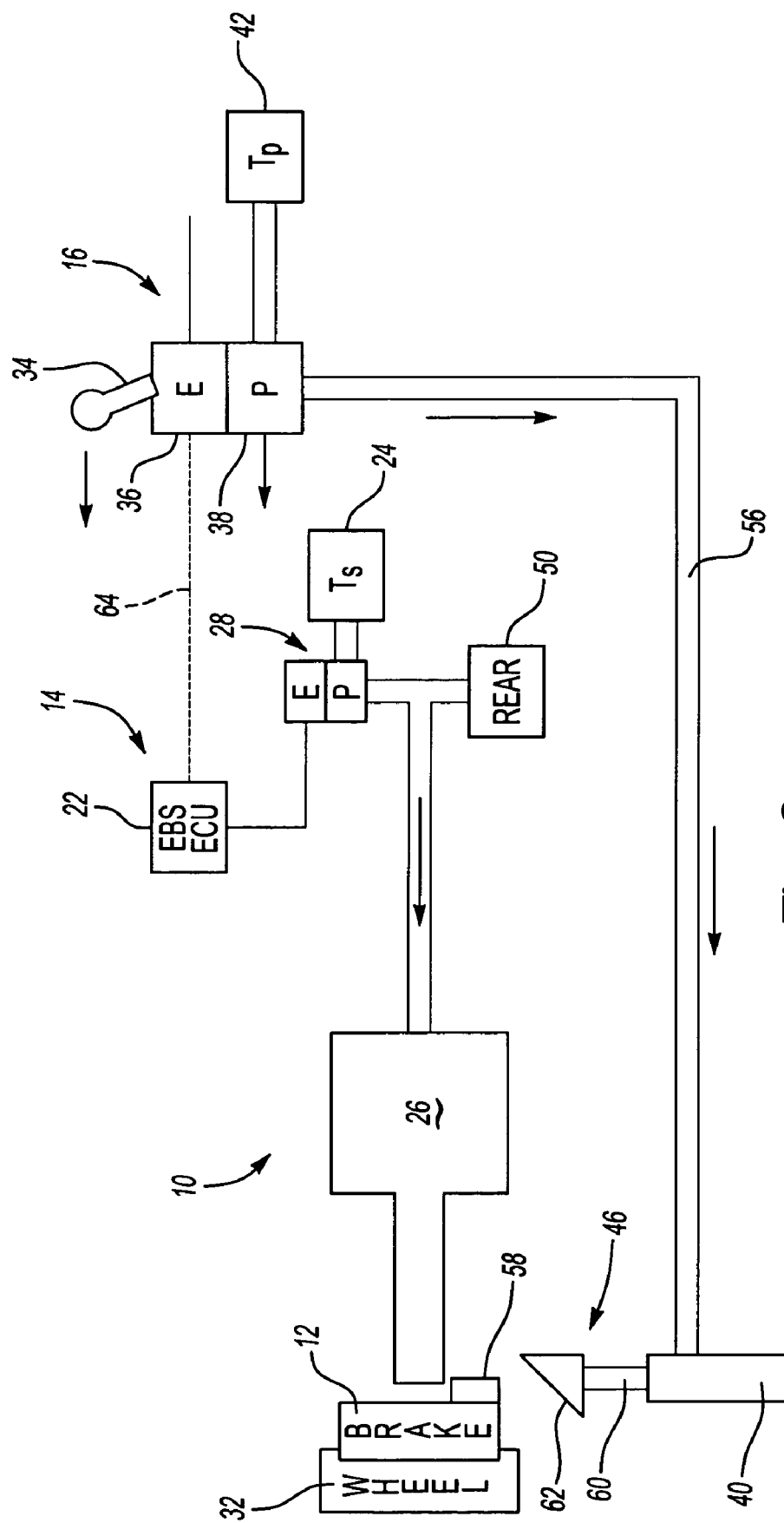
FIG. 6 is a schematic diagram of the system of FIG. 1 showing a locking release mode.

When the hand control 34 is moved to the release position, as shown in FIG. 6, the electronic control element 36 generates a release signal 64 that is communicated to the ECU 22. The ECU 22 commands the EBS to apply the brakes 12 to unload the wedge member 62. The EBS re-pressurizes the air chamber 26 to apply the brake 12. Also, the pneumatic control element 38 is activated to apply air pressure in the air cylinder 40. The combination of the application of the brake 12 and the application of air pressure in the air cylinder 40 causes the wedge member 62 to be unloaded and the cylinder extension shaft 60 to be retracted to an unlocked position.

Figure 7:
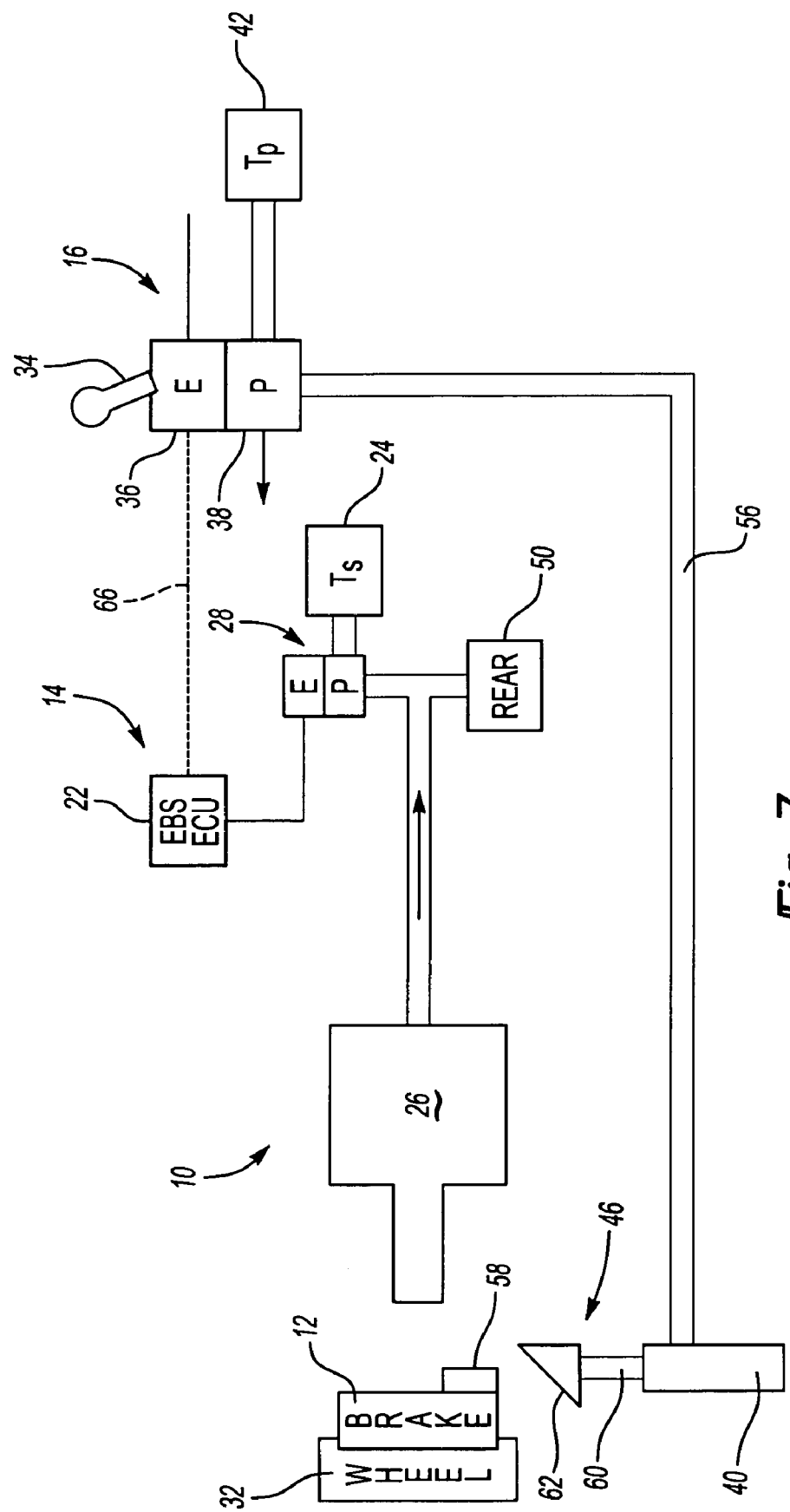
FIG. 7 is a schematic diagram of the system of FIG. 1 showing park release and EBS release.

Also, once the air cylinder 40 is moved to the unlocked position, an electronic release signal 66 is communicated to the ECU 22, as shown in FIG. 7. The ECU 22 then releases air from the air chamber 26 to move the brake 12 to a non-applied position. This allows the wheel 32 to rotate freely during normal vehicle operation.

The air cylinder 40 extends the wedge member 62 from the cylinder 40 to block the back travel of a brake operating component 58. After the wedge member 62 is moved into place, should the air become exhausted through leakage from the air chamber 26, the wedge member 62 must be capable of holding back the reaction forces of the brake operating component 58. Due to the travel and design angle requirements and the size limitations on the air cylinder 40, a secondary locking mechanism 80 (a locking mechanism in addition to the wedge member 62) is required within the cylinder 40 to provide sufficient locking force.

Locking cylinders have been used in factory automation systems and vehicle braking systems. This type of cylinder typically is a double acting cylinder that includes a separate control port for the cylinder locking mechanism. A collet or claming ring mechanism is held off by a separate air control port. It is not feasible to use this type of configuration in the subject braking application. The cost and space limitations of the braking control system do not permit a second pneumatic or electrically controlled locking mechanism.

Figure 8:
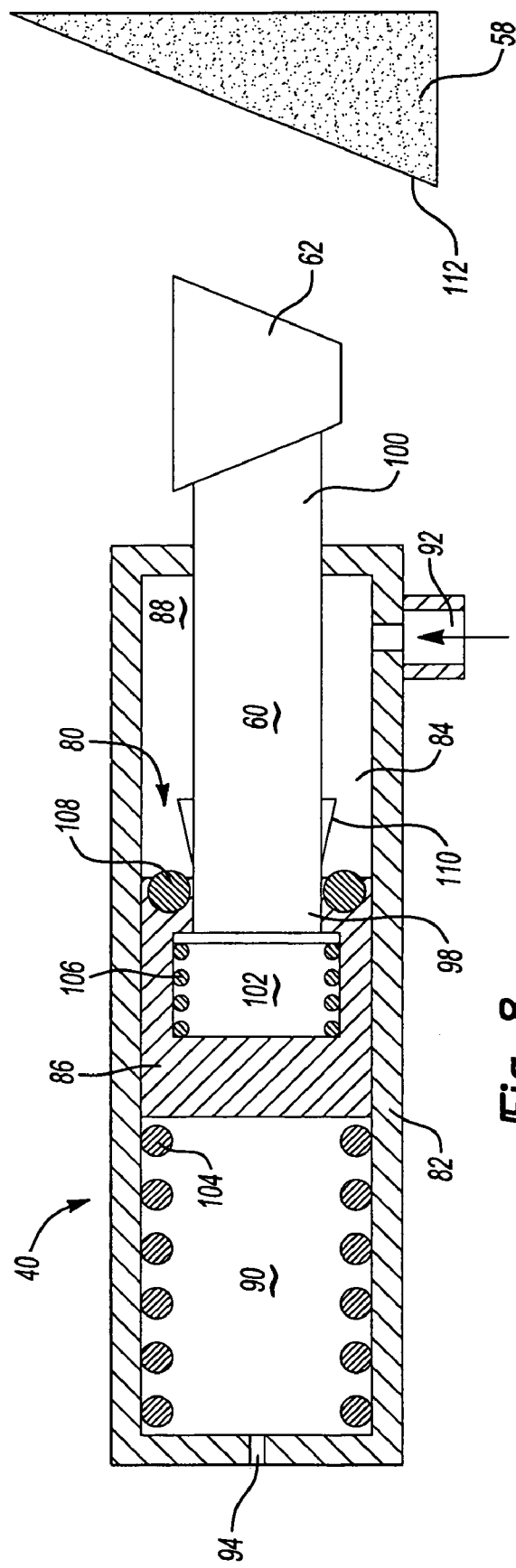
FIG. 8 is a schematic cross-sectional view of a locking air cylinder as used in the system of FIGS. 1-7 with the locking air cylinder shown in a retracted position.

The subject invention utilizes a unique locking air cylinder that does not require a separate control port to actuate the locking mechanism. FIG. 8 shows the air cylinder 40 in a retracted position with the air connection 56 to the cylinder 40 being pressurized. The air cylinder 40 includes a cylinder housing 82 defining an internal cavity 84. A piston 86 is slidably received within the internal cavity 84 and divides the cavity 84 into first 88 and second 90 chambers. The air connection 56 supplies air to the first chamber 88 via an air supply port 92 formed within the cylinder housing 82. A vent port 94 is formed within the second chamber 90.

The extension shaft 60 includes a first end 98 that is operably coupled to the piston 86 and a second end 100 that supports the wedge member 62. The piston 86 defines an inner cavity 102. The first end 98 of the extension shaft 60 is received within the inner cavity 102. A main resilient spring member 104 is mounted within the second chamber 90. The main resilient spring member 104 reacts between the cylinder housing 82 and the piston 86. A secondary resilient 102. The first end 98 of the extension shaft 60 is received within the inner cavity 102. A main resilient spring member 104 is mounted within the second chamber 90. The main resilient spring member 104 reacts between the cylinder housing 82 and the piston 86. A secondary resilient spring member 106 is mounted within the inner cavity 102 of the piston 86. The secondary resilient spring member 106 reacts between the extension shaft 60 and the piston 86. A plurality of locking balls 108 is caged within the piston 86. A tapered disc locking ramp surface 110 is formed on or mounted on the extension shaft 60 near the first end 98. The locking balls 108 cooperate with the locking ramp surface 110 to provide the secondary or cylinder locking function.

Figure 9:
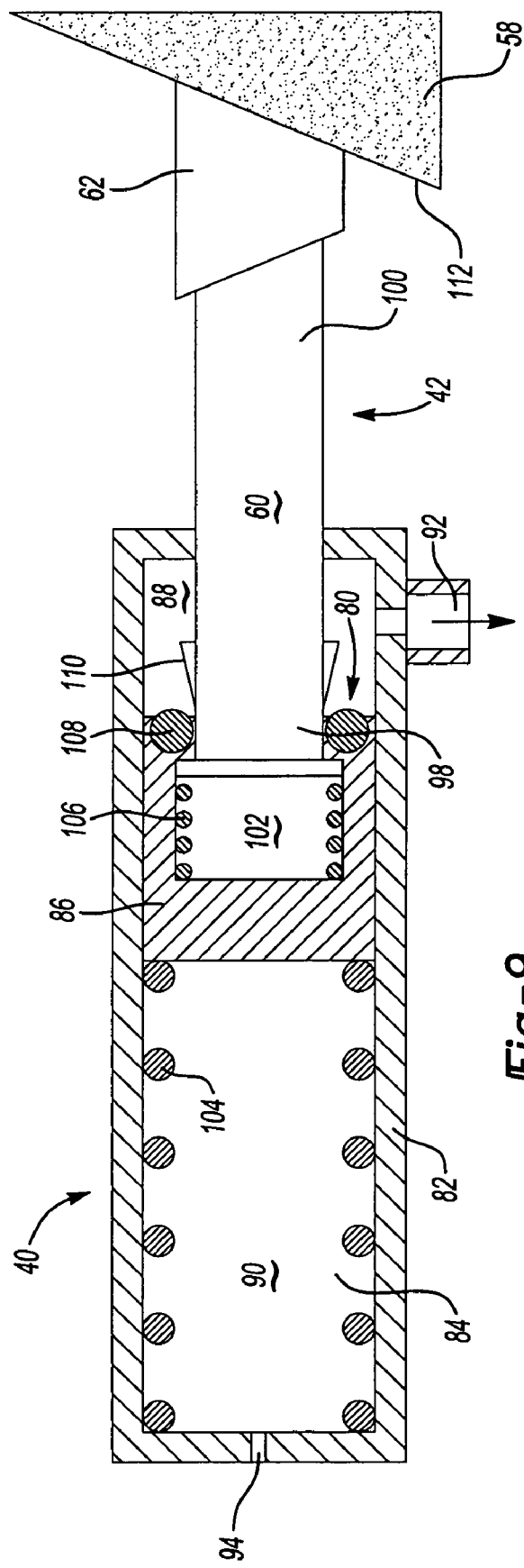
FIG. 9 shows the locking cylinder of FIG. 8 in an extended and unlocked position.

In FIG. 8, the cylinder 40 is shown in a retracted position with air pressure being supplied to the first chamber 88 via the air supply port 92. In FIG. 9, air is removed from the air supply port 92 and the main resilient spring member 104 is no longer held back by the piston 86. The main resilient spring member 104 moves the piston 86 toward the brake operating component 58. The piston 86 acts on the extension shaft 60 through the secondary resilient spring member 106. The stiffness of the secondary resilient spring member 106 should be greater than any friction forces that must be overcome in moving the extension shaft 60 as the shaft 60 is fully extended to contact the mating angled surface 112 of the brake operating component 58.

Figure 10:
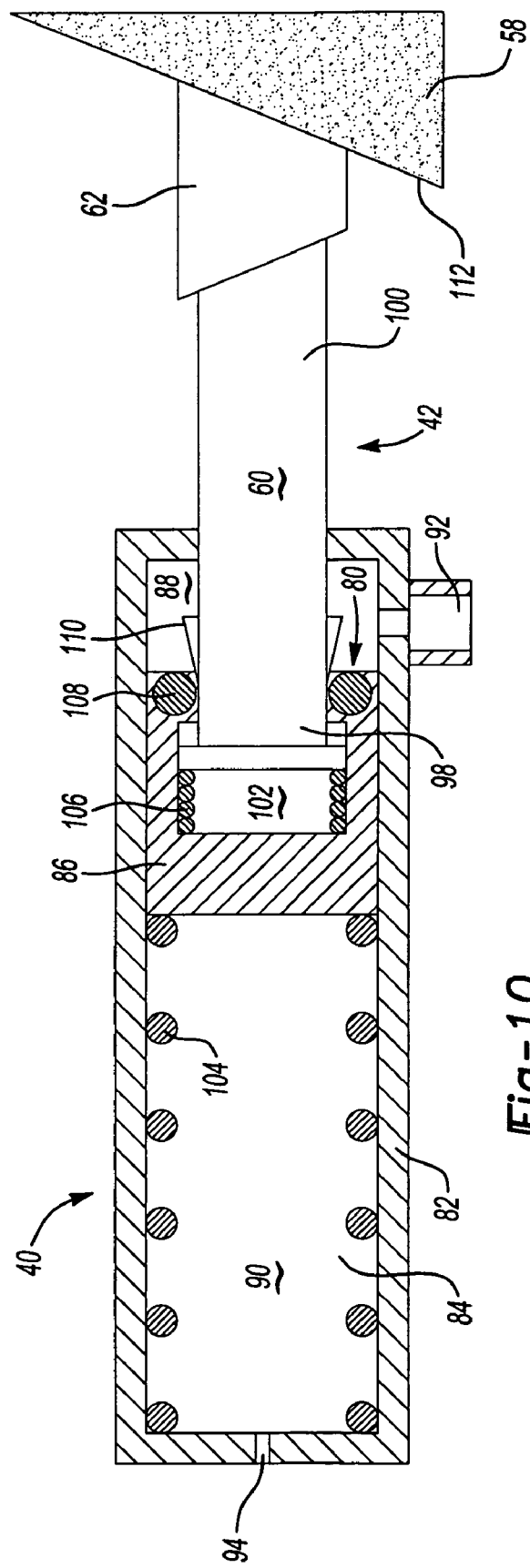
FIG. 10 shows the locking cylinder of FIG. 8 in an extended and locked position.

In FIG. 10 the extension shaft 60 is shown fully extended with the wedge member 62 in abutting engagement with the brake operating component 58. The extension shaft 60 is prohibited/constrained from further movement. The piston 86 continues to move to actuate the secondary locking mechanism 80. The piston 86 moves relative to the extension shaft 60 causing the piston 86 and shaft 60 to collapse together, further compressing the secondary resilient spring member 106. At this point, the force of the main resilient spring member 104 is greater than the force of the secondary resilient spring member 106. This relative motion between the shaft 60 and piston 86 only occurs once the extension shaft 60 is constrained by the abutment between the wedge member 62 and the brake operating component 58.

This relative motion also causes the secondary or cylinder locking effect to occur. The piston 86 pushes the locking balls 108 forward until they contact the angled surface of the locking ramp surface 110 on the extension shaft 60. The balls 108 become wedged between the ramp surface 110 and the walls of the cylinder housing 82. This wedging action generates a high locking force between the extension shaft 60 and cylinder housing 82. This locking force is much greater than the force generated by the main resilient spring member 104 alone. As a result, the extension shaft 60 is capable of holding back the reaction forces from the brake operating component 58.

Figure 11:
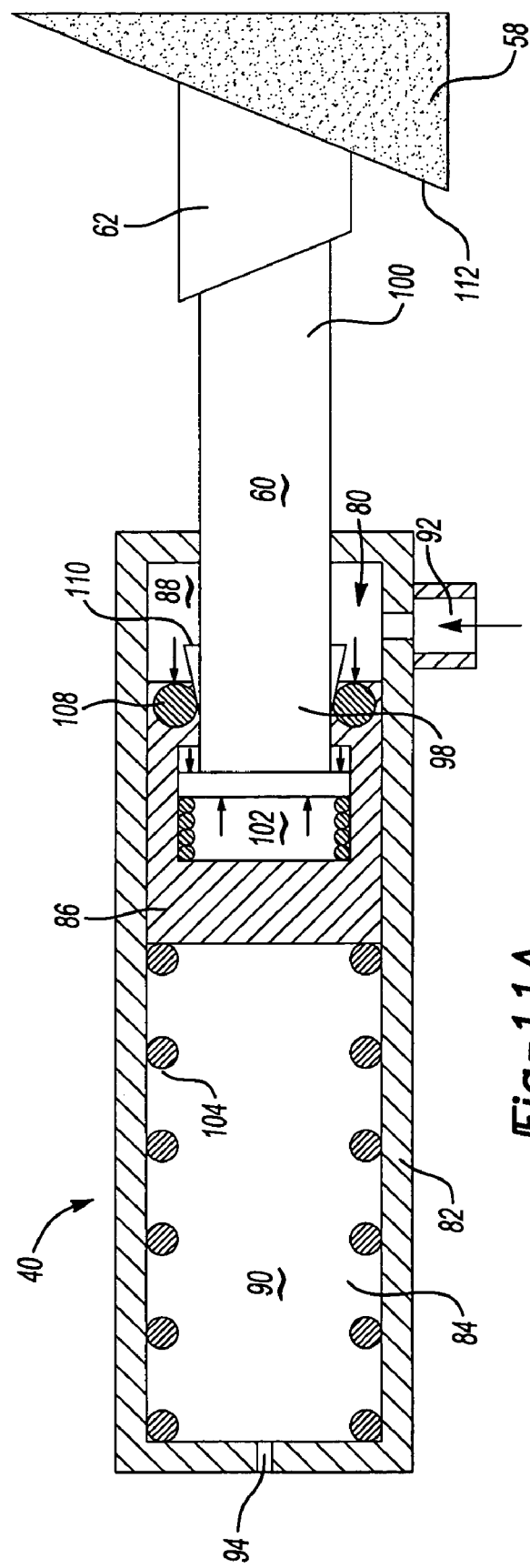
FIG. 11A shows the locking cylinder of FIG. 8 at the start of unlocking.
FIG. 11B shows the locking cylinder of FIG. 8 in a release and unlocked position.

In FIGS. 11A and 11B, the process is reversed to move the cylinder 40 to the unlocked position. With the force removed from the extension shaft wedge member 62 by the additional application force supplied by the service brake system 14 against the brake operating component 58, the wedge member 62 can be easily retracted. The air cylinder 40 is re-pressurized via the air supply port 92. As air is re-introduced into the first chamber 88, the piston 86 is forced against the main resilient spring member 104. Air enters the inner cavity 102 and this creates a force, which in addition to that of the secondary resilient spring member 106, causes the balls 108 to be moved relative to the locking ramp surface 110. This is shown in FIG. 11A. As the balls 108 move, the locking force between the cylinder walls and the extension shaft 60 is removed and the cylinder 40 is in an unlocked position, as shown in FIG. 11B. Further movement of the piston 86 draws the extension shaft 60 into the cylinder housing 82, retracting the wedge member 62 away from the brake operating component 58. As long as the first chamber 88 is pressurized, the cylinder 40 remains in the retracted position, shown in FIG. 8.

Figure 12:
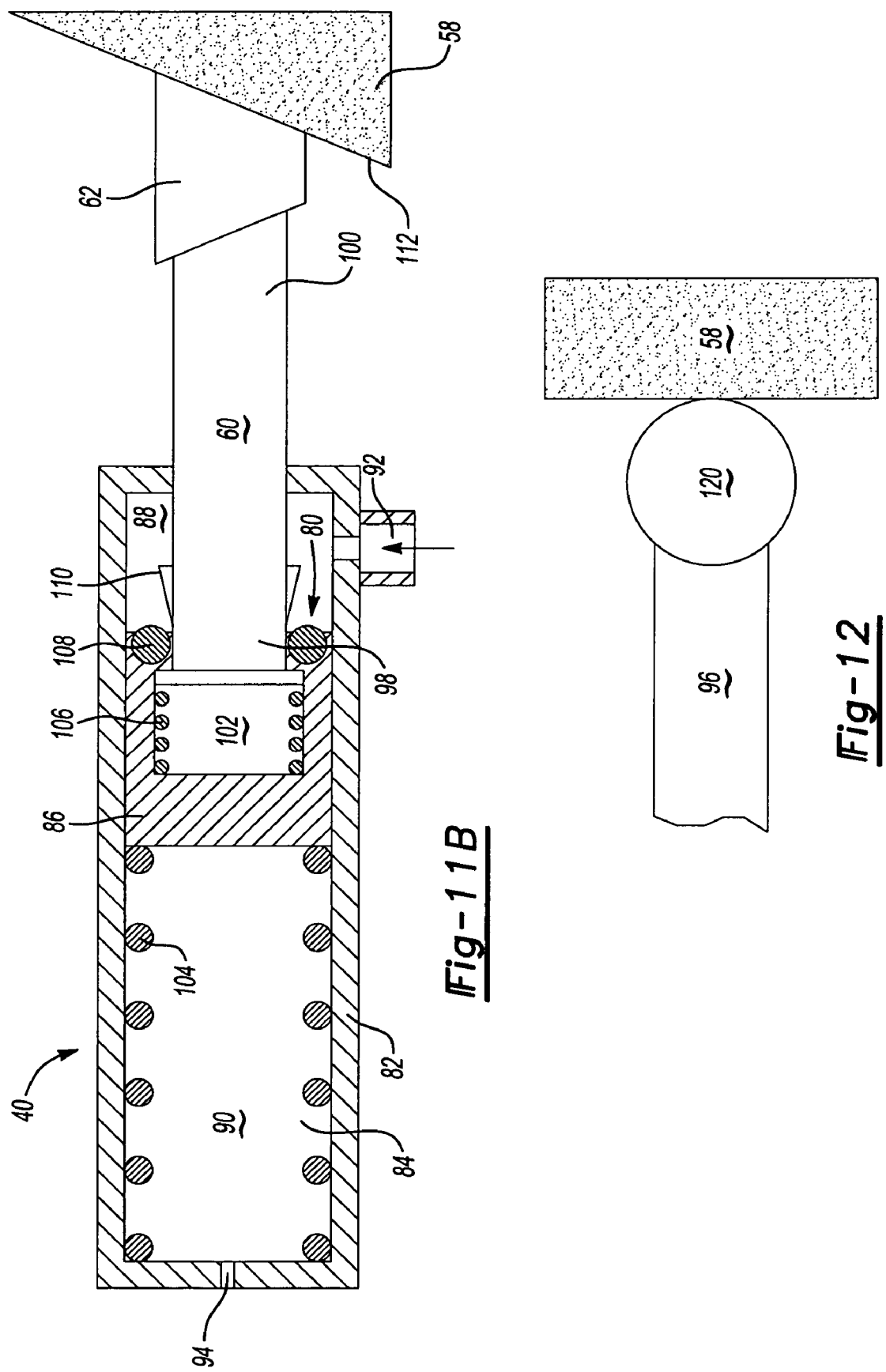
FIG. 12 schematically shows a locking component comprising a pin.

Optionally, instead of a wedge of pin member 62, a pin 120 as shown in FIG. 12, could also be used. The pin 120 engages the brake operating component 58 to lock the brake 12 in an applied position for parking. In this configuration, the position that the brake 12 is locked in for parking remains fixed (as opposed to the wedge park position, which can vary). This configuration operates in the same manner as described above, but the internal or secondary locking mechanism 80 is not needed. The secondary locking mechanism 80 is preferred for the wedge member 62 because a force is generated that tends to drive the wedge member 62 from engagement with the brake operating component 58.

An alternate embodiment of a vehicle braking system 210 is shown in FIGS. 13-19. This system utilizes the pin 120 to provide park locking and eliminates the need for the secondary locking mechanism in the air cylinder. Further this alternate braking system 210 utilizes a spring return air cylinder 240 instead of the spring apply air cylinder shown in the braking system 10 of FIGS. 1-11.

Figure 13:
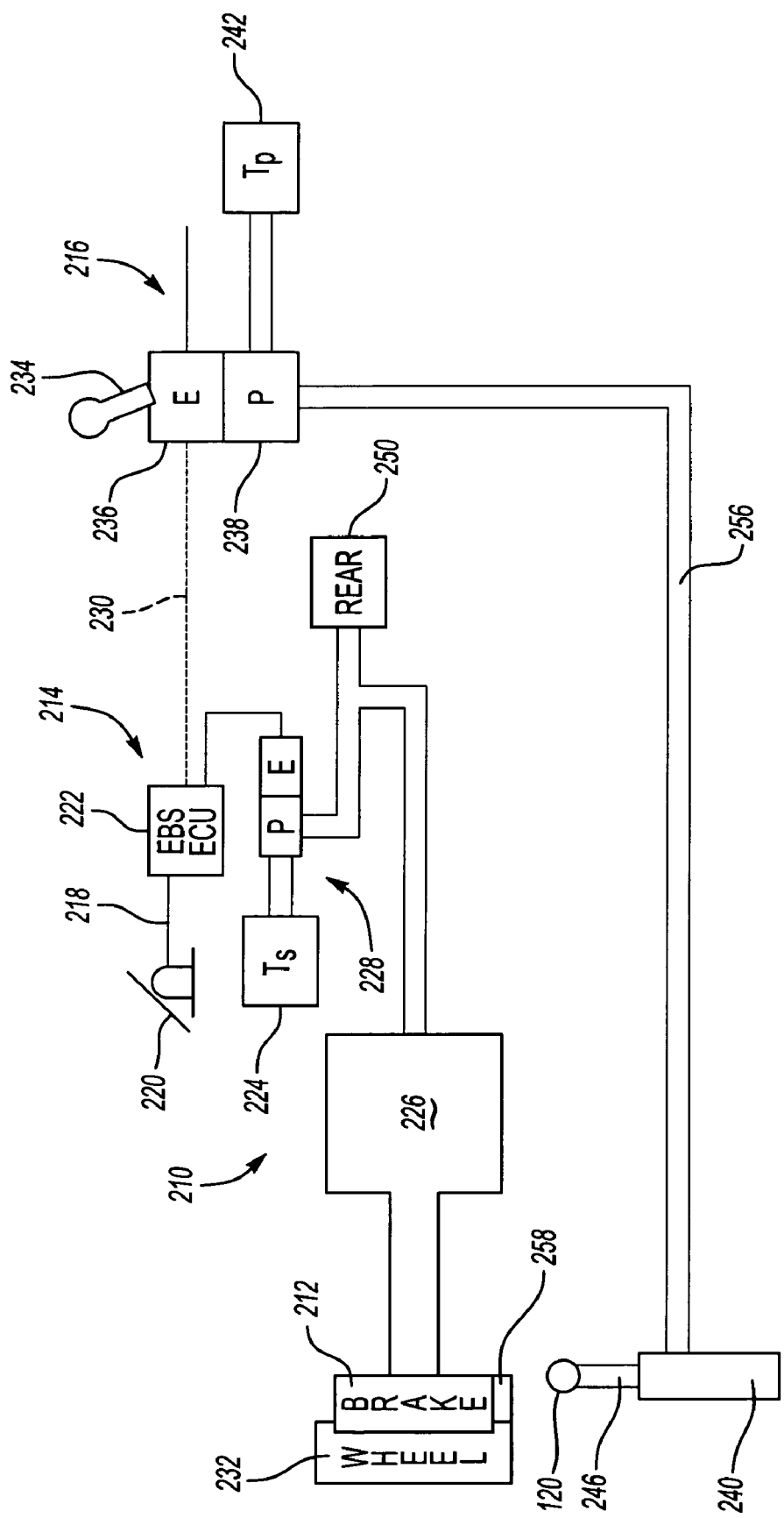
FIG. 13 is a schematic diagram of a vehicle braking system incorporating the subject invention using a spring return locking device.

As shown in FIG. 13, a front brake 212 assembly includes a service brake system shown generally at 214 and a parking brake system shown generally at 216. As previously discussed, the subject parking brake system 216 is especially useful for front axle assemblies on heavy-duty commercial vehicles, however, it should be understood that the parking brake system 216 could also be utilized in other axle configurations.

The service brake system 214 is preferably an electronic braking system (EBS) that is responsive to electronic control signals 218 generated by depressing a service brake actuator 220, such as a brake pedal. The electronic control signals 218 are communicated to an ECU 222, which then issues a braking command. The ECU 222 includes an electro-pneumatic valve 228, which is preferably integrated with the ECU 222. In response to a braking demand, from the main ECU, the module sets the required pressure in the air chamber 226.

A service brake air reservoir or tank 224 provides pressurized air to a front air chamber 226 via the electro-pneumatic valve 228. Once the air chamber 226 is pressurized, the air chamber 226 applies the brake assembly 212 to brake a vehicle wheel 232. While only one air chamber 226 is shown in FIG. 13, it should be understood that each wheel 232 on an axle assembly includes a brake 212 and an associated air chamber 226 to actuate the brake 212.

The parking brake system 216 includes a dual hand control 234 that is manipulated by a vehicle operator. The dual hand control 234 includes an electronic control element 236 and a pneumatic control element 238. The electronic control element 236 generates electrical signals 230 that are communicated to the ECU 222 for the EBS. The pneumatic control element 238 communicates with a parking brake air reservoir 242 and an air cylinder 240. The air cylinder 240 includes a locking mechanism 246 that selectively engages the wheel brake 212 to lock the brake 212 in a park condition.

Figure 14:
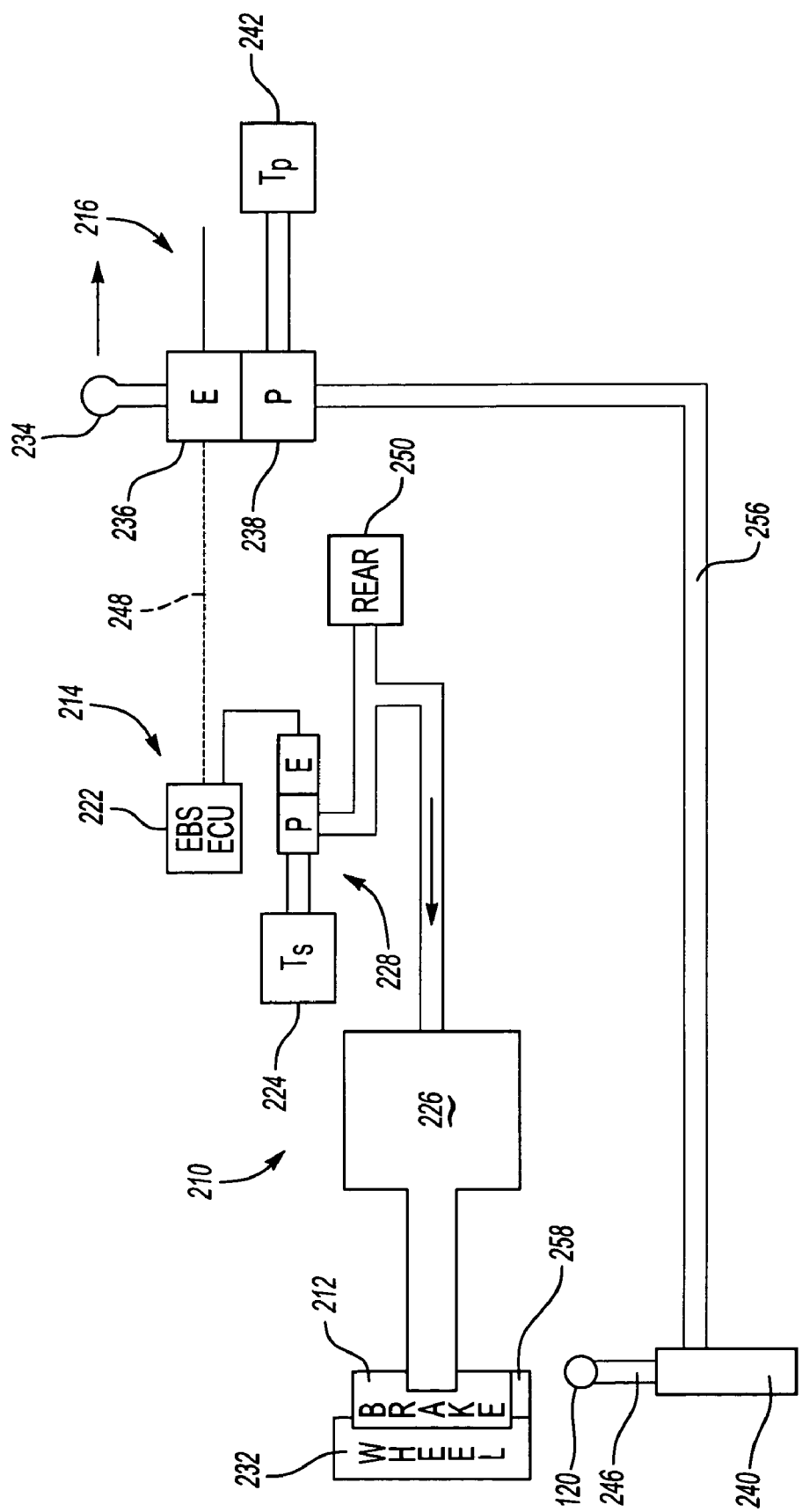
FIG. 14 is a schematic diagram of the system of FIG. 13 showing proportional control.

The parking brake system 216 also provides proportional control as shown in FIG. 14. As the vehicle operator manipulates the hand control 234, an electronic control signal 248 is communicated to the ECU 222. The ECU 222 commands the EBS to apply the brakes, i.e., front 212 and rear 250 brakes, in proportion to the braking demand generated by the hand control 234. As shown in FIG. 2, the EBS pressurizes the air chambers 226 to apply the front brake 212.

Figure 15:
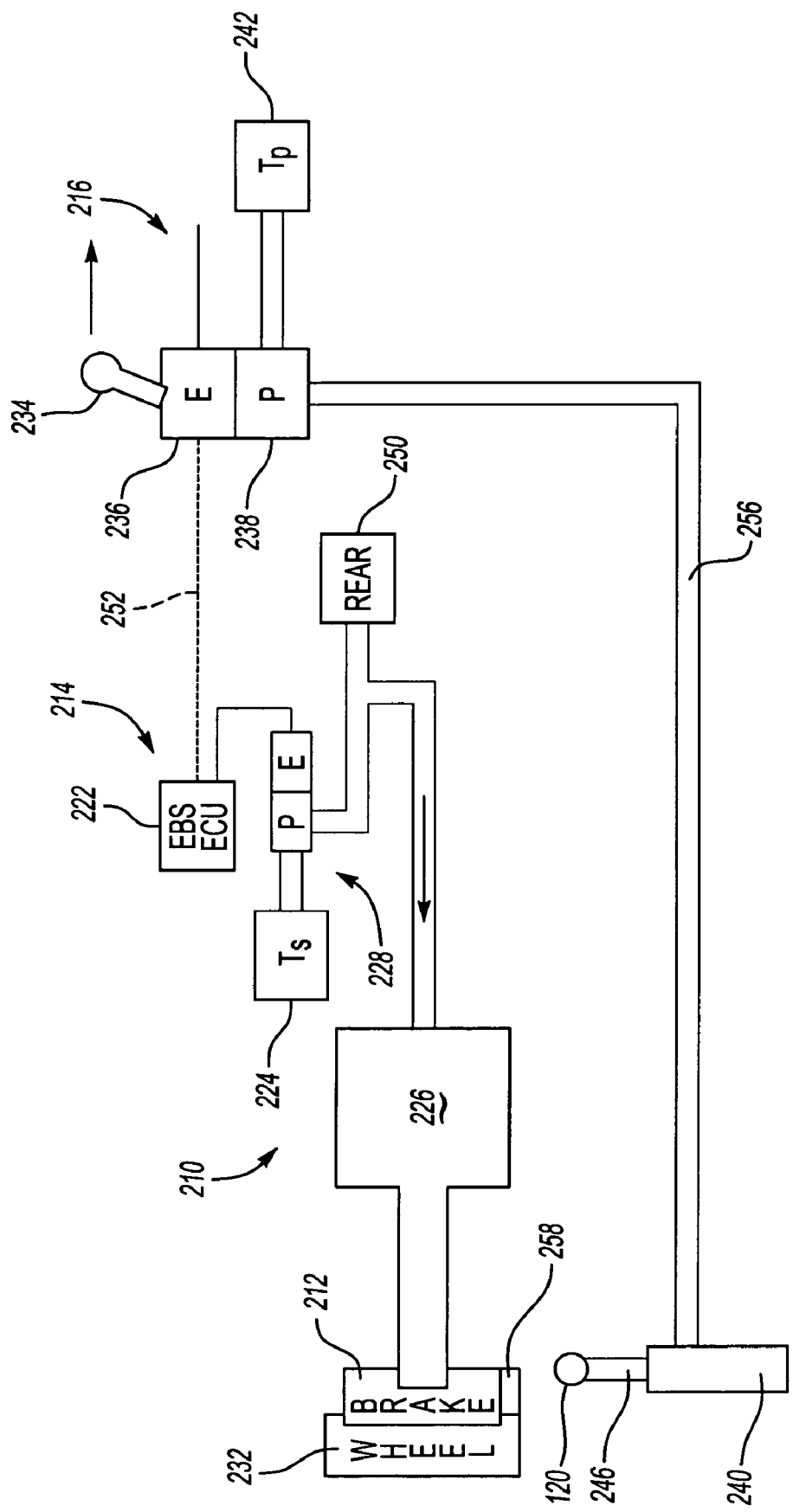
FIG. 15 is a schematic diagram of the system of FIG. 13 showing EBS actuation in response to a park demand.

When the hand control 234 is moved into a park position, as shown in FIG. 15, the electronic control element 236 generates an electronic park demand signal 252 that is communicated to the ECU 222. The ECU 222 commands the EBS to apply the brake 212 at the required braking level for parking. The ECU 222 accomplishes this by pressurizing the air chamber 226 to apply the brake 212.

Figure 16:
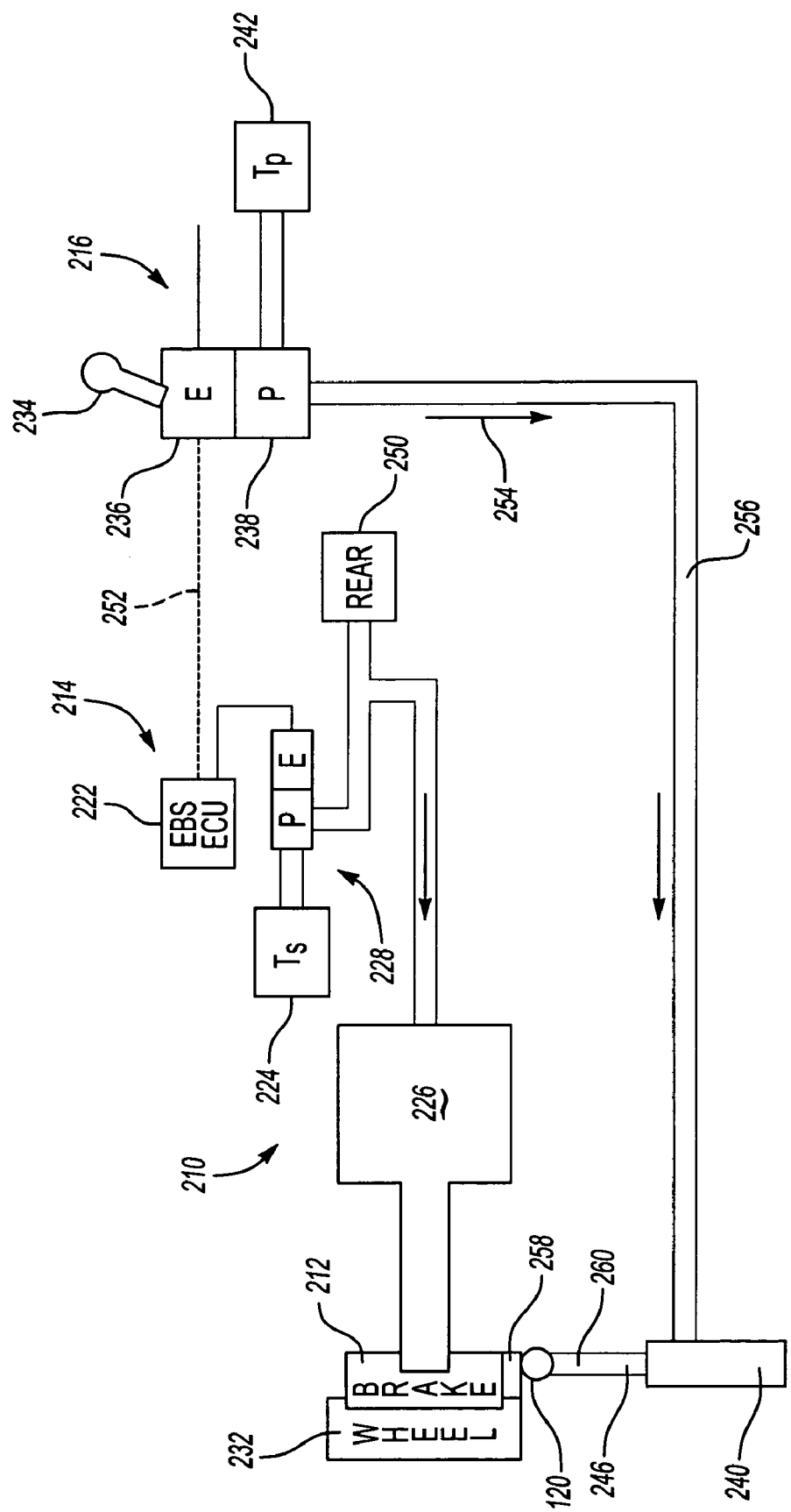
FIG. 16 is a schematic diagram of the system of FIG. 13 showing a locking device actuated in response to a park demand.

Also, when the hand control 234 is moved into the park position, the pneumatic control element 238 generates an air signal 254 that is communicated to the air cylinder 240, as shown in FIG. 16. Air from the parking brake air reservoir 242 pressurizes an air connection line 256 to the air cylinder 240 via the pneumatic control element 238, which comprises a hand control valve. When the air cylinder 240 is pressurized, the locking mechanism 246 moves to a lock position in which the locking mechanism 246 engages a brake operating member or component 258 to lock the brake 212 in a parked condition. The locking mechanism 246 includes an extension shaft 260 with the pin 120 supported on one end of the shaft 260. The pin 120 engages the brake operating component 258 to hold the brake 212 in the applied position.

Figure 17:
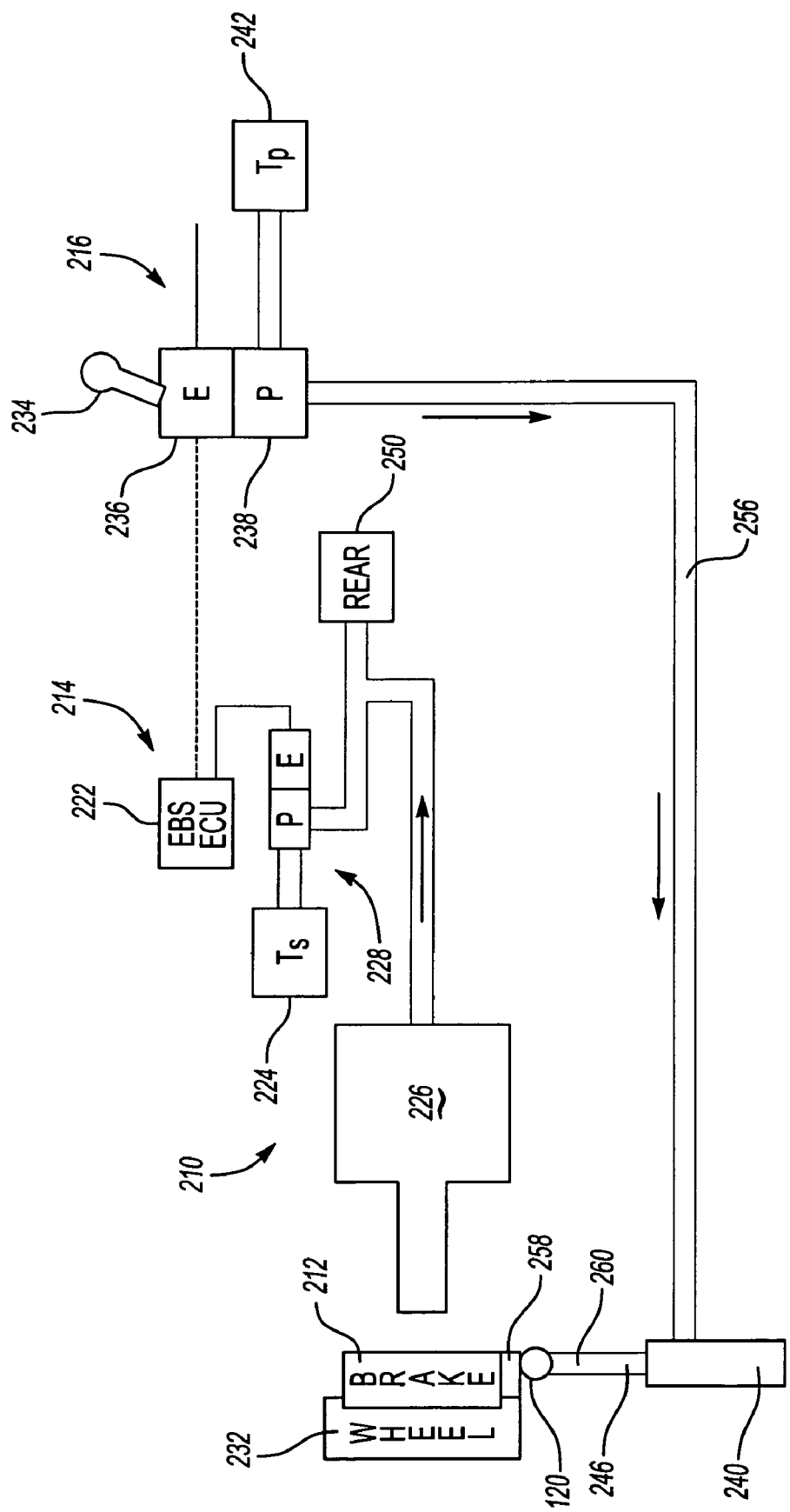
FIG. 17 is a schematic diagram of the system of FIG. 13 showing EBS release with park lock.

Once the air cylinder 240 and locking mechanism 246 are in the lock position, the EBS releases air from the air chamber 226 while the brake 212 remains locked in the applied position, as shown in FIG. 17. Air remains in the air connection 256 to the air cylinder 240, however, if the air leaks away, the locking mechanism 246 remains clamped. Thus, due to the mechanical locking engagement, the system remains in the locked position even when there is no air pressure in the air chamber 226 or in the air cylinder connection line 254.

Figure 18:
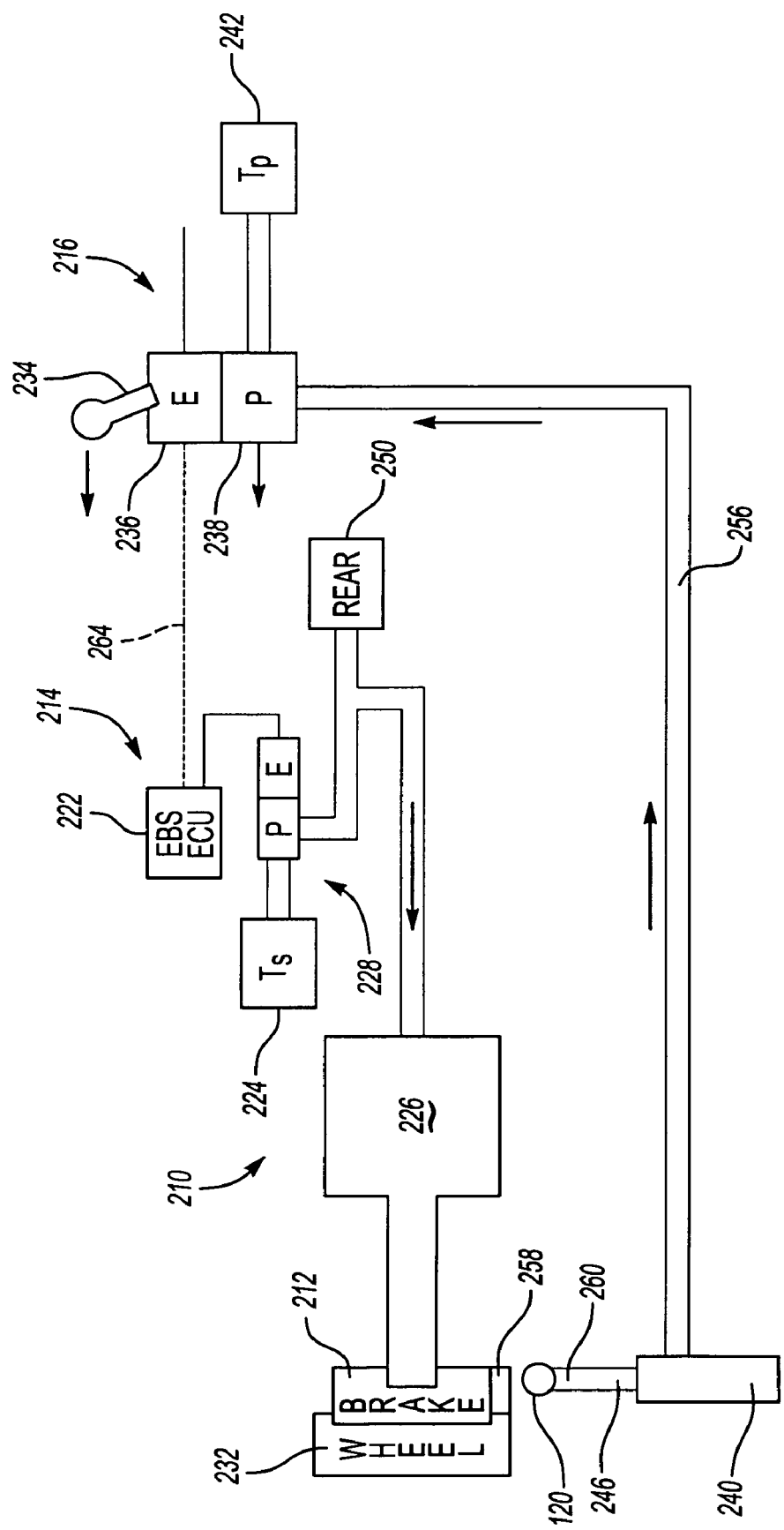
FIG. 18 is a schematic diagram of the system of FIG. 13 showing a locking release mode.

When the hand control 234 is moved to the release position, as shown in FIG. 18, the electronic control element 236 generates a release signal 264 that is communicated to the ECU 222. The ECU 222 commands the EBS to apply the brakes 212 to unload the pin 120. The EBS re-pressurizes the air chamber 226 to apply the brake 212. Also, the pneumatic control element 238 is activated to release air pressure in the air cylinder 240. The combination of the application of the brake 212 and the release of air pressure in the air cylinder 240 causes the pin 120 to be unloaded and the cylinder extension shaft 260 to be retracted to an unlocked position.

Figure 19:
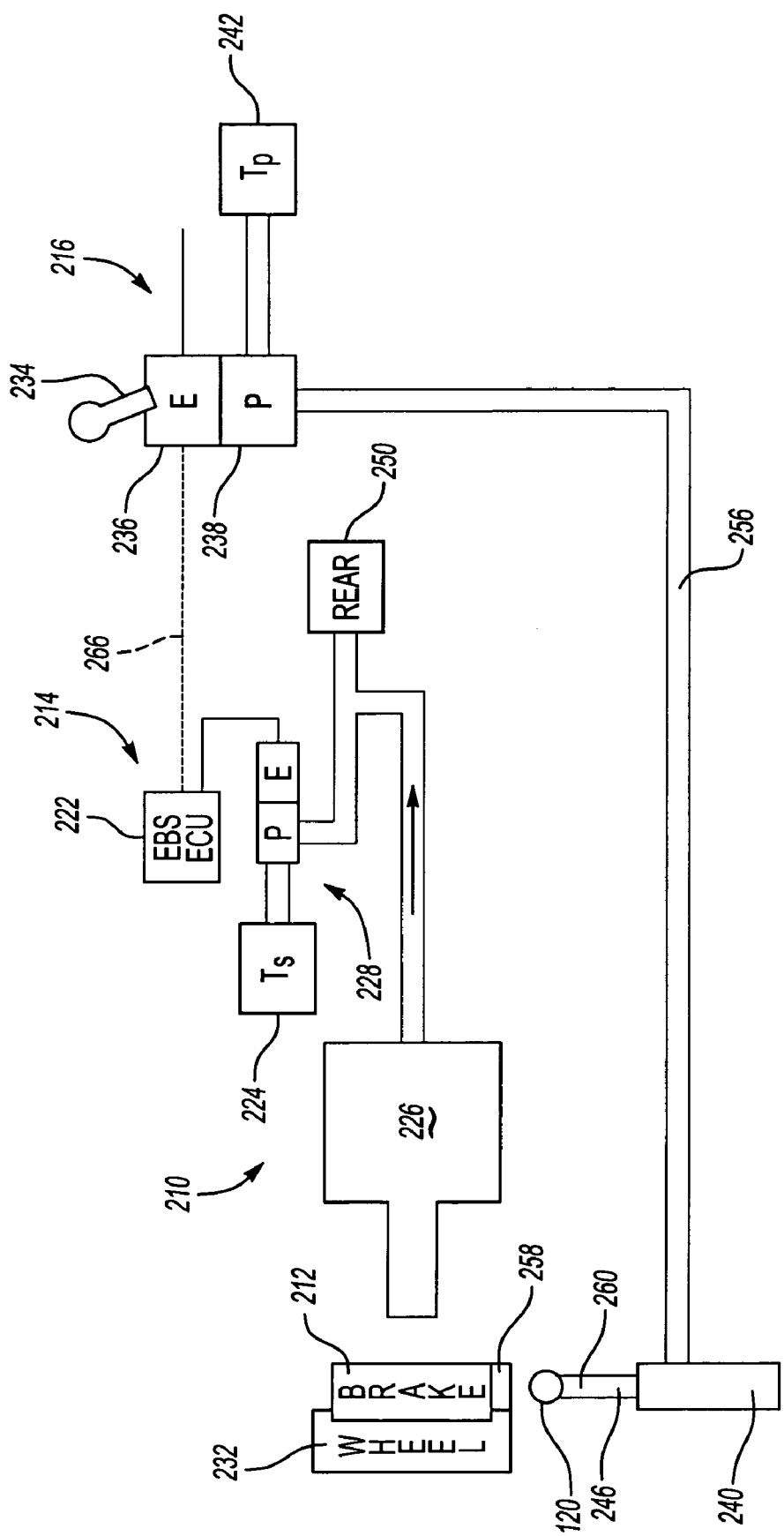
FIG. 19 is a schematic diagram of the system of FIG. 13 showing park release and EBS release.

Also, once the air cylinder 240 is moved to the unlocked position, an electronic release signal 266 is communicated to the ECU 222, as shown in FIG. 19. The ECU 222 then releases air from the air chamber 226 to move the brake 212 to a non-applied position. This allows the wheel 232 to rotate freely during normal vehicle operation.

A schematic representation of the operation of the parking brake systems 16, 216, which works with either the spring apply configuration shown in FIGS. 1-7 or the spring return configuration shown in FIGS. 13-19, is shown in FIGS. 20A through 20D. The brake 12, 212 includes a rotating brake disc 70 and a pair of brake pads 72. The chamber 26, 226 actuates a pivoting brake operating component 58, 258. The brake operating component 58, 258 includes a cam 76 at one end of a lever 74 that actuates a brake piston 78, which forces the pads 72 into engagement with the brake disc 70.

FIG. 20A shows the brake 12, 212 in a released or non-applied position, with chamber 26, 226 retracted. FIG. 20B shows the brake 12, 212 in the park applied position, with the chamber 26, 226 extended and the wedge member 62 or pin 120 engaging the brake operating component 58, 258 to lock the brake 12, 212 in the applied position. FIG. 20C shows that the brake 12, 212 remains in park should the air chamber 26, 226 become exhausted through air leakage, due to the engagement between the wedge member 62 or pin 120 and the brake operating component 58, 258. FIG. 20D shows the brake 12, 212 being reapplied to release the wedge member 62 or pin 120 from engagement with the brake operating component 58, 258.

One of the benefits of the subject braking system is that proportional control and parking under EBS control are provided in combination with the pneumatically controlled and mechanically lockable parking feature. Also, if the EBS fails, the parking apply and release is possible via the EBS back-up system. The driver would apply the service brakes and via the EBS back-up, the brakes would be applied. By subsequently operating the hand control, the locking mechanism would be actuated, locking the brake in the applied condition, as discussed above. Another benefit is that the spring chamber is eliminated and no ECU or motors are required in the wheel end to lock the brake in a parked condition. Thus, the subject system is more cost effective, reduces weight, and is easily packaged into existing EBS configurations.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A parking brake system for a vehicle comprising:
   an air chamber for actuating a vehicle brake assembly;
   a parking demand mechanism selectively actuated to mechanically apply a brake force to the vehicle brake assembly, said parking demand mechanism comprising a dual hand control including an electronic control element for communicating with an electronic braking system control unit and a pneumatic control element for communicating with a parking brake air reservoir; and
   an air cylinder having a locking component that locks the vehicle brake assembly in an applied condition wherein said locking component is pneumatically controlled in response to movement of said dual hand control, and wherein said locking component includes a first locking mechanism and a second locking mechanism that cooperate with each other to hold the vehicle brake assembly in said applied condition.

2. The system of claim 1 wherein said dual hand control provides proportional control by generating an electronic control signal from said electronic control element in response to movement of said dual hand control, said electronic control signal being communicated to said electronic braking system control unit wherein said electronic braking system control unit applies the vehicle brake assembly in proportion to a braking demand generated by movement of said dual hand control.

3. The system of claim 1 wherein said dual hand control is operably connected to a hand control valve fluidly connecting said parking brake air reservoir to said air cylinder.

4. The system of claim 3 wherein said dual hand control generates an electronic park control signal from said electronic control element in response to said dual hand control being moved to a park position, said electronic park control signal being communicated to said electronic braking system control unit wherein said electronic braking system control unit applies the vehicle brake assembly to a required level for parking.

5. The system of claim 4 wherein said pneumatic control element generates an air signal to said air cylinder to move said locking component to a locked position when said dual hand control is moved to said park position.

6. The system of claim 5 wherein air is supplied to said air cylinder from said parking brake air reservoir via said hand control valve to pressurize said air cylinder to actuate said locking component.

7. The system of claim 5 wherein said electronic braking system control unit releases air from said air chamber while said locking component remains in said locked position.

8. The system of claim 7 wherein said electronic control element generates an electronic release signal when said dual hand control is moved to a release position, said electronic release signal being communicated to said electronic braking system control unit wherein said electronic braking system control unit applies the vehicle brake assembly to unload said locking component.

9. The system of claim 8 wherein said pneumatic control element releases air from said air cylinder to return said locking component to an unlocked position in response to said dual hand control being moved to said release position.

10. The system of claim 9 wherein said electronic braking system control unit generates a release control signal to exhaust air from said air chamber and move the vehicle brake assembly to a non-applied position.

11. The system of claim 9 wherein said air cylinder includes a spring member to return said locking component to said unlocked position.

12. The system of claim 5 wherein said locking component comprises a pin mounted to an extension shaft wherein said air cylinder is pressurized to extend said extension shaft such that said pin engages a brake operating member to lock the vehicle brake assembly in a park condition.

13. The system of claim 1 wherein said first locking mechanism comprises a first lock member supported by a shaft that extends outwardly from said air cylinder to engage a brake component and said second locking mechanism comprises a second lock member housed within said air cylinder that holds said shaft in a lock position.

14. The system of claim 1 wherein said pneumatic control element generates an air signal when said dual hand control is moved into a park position, and wherein said air signal actuates said locking component in said air cylinder.

15. The system of claim 14 wherein when said dual hand control is moved into the park position, said electronic control element generates an electronic park demand signal to apply the vehicle brake assembly at a required braking level for parking.

16. The system of claim 1 wherein said electronic control element generates an electronic signal to apply the vehicle brake assembly in response to a park demand and wherein said pneumatic control element generates an air signal to actuate said locking component in response in the park demand.

17. A parking brake system for a vehicle comprising:
an air chamber for actuating a vehicle brake assembly;
a parking demand mechanism selectively actuated to mechanically apply a brake force to the vehicle brake assembly, said parking demand mechanism comprising a dual hand control including an electronic control element for communicating with an electronic braking system control unit and a pneumatic control element for communicating with a parking brake air reservoir, and wherein said dual hand control is operably connected to a hand control valve fluidly connecting said parking brake air reservoir to an air cylinder, and wherein said dual hand control generates an electronic park control signal from said electronic control element in response to said dual hand control being moved to a park position, said electronic park control signal being communicated to said electronic braking system control unit wherein said electronic braking system control unit applies the vehicle brake assembly to a required level for parking; and said air cylinder having a locking component that locks the vehicle brake assembly in an applied condition wherein said locking component is pneumatically controlled in response to movement of said dual hand control, and wherein said pneumatic control element generates an air signal to said air cylinder to move said locking component to a locked position when said dual hand control is moved to said park position, and wherein air is released from said air cylinder via said hand control valve to depressurize said air cylinder to actuate said locking component.

18. The system of claim 17 wherein said locking component comprises an extension shaft having a wedge member mounted to one end where said wedge member engages a brake operating member to lock the vehicle brake assembly in a park condition.

19. The system of claim 18 wherein said air cylinder comprises a cylinder housing defining an interior cavity and having an inlet port and a vent port, a piston slidably mounted within said cylinder housing and separating said interior cavity into at least first and second chambers, and a secondary locking device enclosed within said interior cavity to hold said wedge member in engagement with said brake operating member wherein said extension shaft is operably coupled to said piston.

20. The system of claim 19 wherein said first chamber is pressurized via said inlet port to move said piston and said extension shaft to a lock position.

21. The system of claim 20 including a resilient member operably coupled to said piston and enclosed within said second chamber wherein said resilient member moves said piston and said extension shaft toward said brake operating member when pressurized air is removed from said first chamber in response to said parking demand mechanism being moved to a park position.

22. The system of claim 21 wherein said extension shaft is constrained from further movement once said wedge member engages said brake operating member and wherein said resilient member moves said piston relative to said extension shaft to actuate said secondary locking device.

23. The system of claim 22 wherein said secondary locking device comprises a plurality of balls supported by said piston and a ramped surface formed on said extension shaft, said plurality of balls being forced into engagement with said ramped surface by said resilient member until said locking component achieves said locked position.

24. A parking brake system for a vehicle comprising:
an air chamber for actuating a vehicle brake assembly;
a parking demand mechanism selectively actuated to mechanically apply a brake force to the vehicle brake assembly, said parking demand mechanism comprising a dual hand control including an electronic control element for communicating with an electronic braking system control unit and a pneumatic control element for communicating with a parking brake air reservoir;
an air cylinder having a locking component that locks the vehicle brake assembly in an applied condition wherein said locking component is pneumatically controlled in response to movement of said dual hand control, and wherein said pneumatic control element generates an air signal when said dual hand control is moved into a park position, and wherein said air signal actuates said locking component in said air cylinder; and an air connection line connecting said pneumatic control element to said air cylinder.

* * * * *

UNITED STATES PATENT AND TRADEMARK OFFICE
CERTIFICATE OF CORRECTION

PATENT NO. : 7,407,233 B2 Page 1 of 1
APPLICATION NO. : 10/701351
DATED : August 5, 2008
INVENTOR(S) : McCann et al.

It is certified that error appears in the above-identified patent and that said Letters Patent is hereby corrected as shown below:

Claim 16, column 9, line 54: "in" should read as --to--

Signed and Sealed this

Twenty-first Day of October, 2008

JON W. DUDAS
*Director of the United States Patent and Trademark Office*